US012245050B2

(12) United States Patent
Khati et al.

(10) Patent No.: US 12,245,050 B2
(45) Date of Patent: Mar. 4, 2025

(54) CANOPY COVERAGE DETERMINATION FOR IMPROVED WIRELESS CONNECTIVITY

(71) Applicant: Apple Inc., Cupertino, CA (US)

(72) Inventors: Dhruv Khati, San Jose, CA (US); Shiva Krishna Narra, San Jose, CA (US); Krishna Myneni, Santa Clara, CA (US); Anjaneyulu Maganti, San Jose, CA (US); Sanjeevi Balasubramanian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 17/716,765

(22) Filed: Apr. 8, 2022

(65) Prior Publication Data

US 2023/0082984 A1 Mar. 16, 2023

Related U.S. Application Data

(60) Provisional application No. 63/245,099, filed on Sep. 16, 2021, provisional application No. 63/245,056, filed on Sep. 16, 2021.

(51) Int. Cl.
*H04W 16/22* (2009.01)
*G06T 7/33* (2017.01)
(Continued)

(52) U.S. Cl.
CPC .............. *H04W 16/22* (2013.01); *G06T 7/33* (2017.01); *H04B 17/3913* (2015.01);
(Continued)

(58) Field of Classification Search
CPC ............ G06T 7/33; G06T 2207/30184; G06T 2207/30188; H04B 17/3913; H04W 16/22;
(Continued)

(56) References Cited

U.S. PATENT DOCUMENTS 8,645,557 B2  2/2014  Douady et al.
8,717,233 B2  5/2014  Ashjaee et al.
(Continued)

FOREIGN PATENT DOCUMENTS

AU  2011235939 A1 * 5/2012 ........... G05D 1/0231
BR  PI1106300 A2 * 1/2014
(Continued)

OTHER PUBLICATIONS

Extended European Search Report for EP Application No. 22176409.5 dated Nov. 23, 2022; 11 pgs.

*Primary Examiner* — Eric Nowlin
(74) *Attorney, Agent, or Firm* — Fletcher Yoder, P.C.

(57) ABSTRACT

The embodiments disclosed herein include capturing images via cameras or light sensors of a mobile communication device, processing the image to determine obstructed (e.g., by foliage) portions and unobstructed (e.g., open sky) portions of the images, and generating a grid indicating the obstructed and unobstructed portions. The device may then adjust operating characteristics, such as synchronizing with a communication hub or other mobile communication device, performing a handover with the communication hub or other mobile communication device, determining transmission power or an amount to increase transmission power, selecting an antenna, determining a beam direction, determining a discontinuous reception cycle or a frequency for receiving data, providing an indication to stop or proceed through certain areas (e.g., to take advantage of areas with higher signal quality or avoid areas with lower signal quality), and the like, based on the obstructed and unobstructed portions identified in the grid.

20 Claims, 15 Drawing Sheets

(51) Int. Cl.
*H04B 17/391* (2015.01)
*H04W 16/28* (2009.01)
*H04W 36/24* (2009.01)
*H04W 36/36* (2009.01)

(52) U.S. Cl.
CPC .......... *H04W 16/28* (2013.01); *H04W 36/24* (2013.01); *G06T 2207/30184* (2013.01); *G06T 2207/30188* (2013.01); *H04W 36/36* (2013.01)

(58) Field of Classification Search
CPC ..... H04W 16/28; H04W 36/24; H04W 36/36; H04W 84/06
See application file for complete search history.

(56) References Cited

U.S. PATENT DOCUMENTS

| | | | |
|---|---|---|---|
| 9,026,315 B2 * | 5/2015 | Anderson | G05D 1/0291 701/50 |
| 9,274,524 B2 * | 3/2016 | Anderson | G05D 1/028 |
| 9,383,753 B1 * | 7/2016 | Templeton | G05D 1/0246 |
| 9,521,317 B2 | 12/2016 | Yu et al. | |
| 9,607,358 B2 | 3/2017 | Takenaka et al. | |
| 9,983,590 B2 * | 5/2018 | Templeton | G05D 1/0231 |
| 10,284,316 B2 * | 5/2019 | Zhihua | H04B 17/3912 |
| 10,333,638 B2 * | 6/2019 | Zhihua | H04B 17/3913 |
| 10,359,496 B2 * | 7/2019 | Zlogar | G01S 3/14 |
| 10,405,196 B1 | 9/2019 | Chadaga et al. | |
| 10,495,464 B2 * | 12/2019 | Irish | G01C 21/005 |
| 10,643,344 B1 | 5/2020 | Chuah | H04N 23/698 |
| 10,823,562 B1 * | 11/2020 | Carnahan | G01C 21/3804 |
| 10,871,779 B2 * | 12/2020 | Templeton | G01S 7/4865 |
| 10,883,829 B2 * | 1/2021 | Irish | G01C 21/005 |
| 10,957,178 B2 | 3/2021 | Beyer et al. | |
| 10,959,109 B1 * | 3/2021 | Liu | G06V 20/176 |
| 11,126,192 B2 * | 9/2021 | Templeton | G01S 7/4865 |
| 11,233,593 B2 * | 1/2022 | Wan | H04B 17/3913 |
| 11,233,628 B2 | 1/2022 | Figueira | |
| 11,259,191 B2 * | 2/2022 | Chen | H04W 16/18 |
| 11,402,845 B2 * | 8/2022 | Templeton | G01S 17/86 |
| 11,422,219 B2 * | 8/2022 | Zlogar | G01S 3/14 |
| 11,467,148 B2 * | 10/2022 | Park | H04B 17/3913 |
| 11,467,595 B2 * | 10/2022 | Templeton | G05D 1/0231 |
| 11,512,955 B1 * | 11/2022 | Carnahan | G06F 16/29 |
| 11,615,606 B2 * | 3/2023 | Chen | G06T 7/149 382/110 |
| 11,809,198 B2 * | 11/2023 | Thomson | G01S 5/018 |
| 11,823,323 B2 * | 11/2023 | Kroon | H04N 19/88 |
| 11,937,539 B2 * | 3/2024 | Kulkarni | G06V 20/58 |
| 11,954,797 B2 * | 4/2024 | Carnahan | G06T 7/70 |
| 12,093,052 B2 * | 9/2024 | Templeton | G01S 17/931 |
| 2012/0095651 A1 * | 4/2012 | Anderson | G05D 1/0291 701/50 |
| 2015/0177736 A1 * | 6/2015 | Anderson | G05D 1/0242 701/25 |
| 2016/0274589 A1 * | 9/2016 | Templeton | G01S 17/86 |
| 2016/0290805 A1 * | 10/2016 | Irish | G01C 21/005 |
| 2017/0045623 A1 * | 2/2017 | Zlogar | G01S 3/14 |
| 2017/0338901 A1 * | 11/2017 | Zhihua | H04B 17/3912 |
| 2018/0267556 A1 * | 9/2018 | Templeton | G05D 1/0246 |
| 2018/0278349 A1 * | 9/2018 | Zhihua | H04W 24/06 |
| 2019/0033879 A1 * | 1/2019 | Templeton | G01S 17/931 |
| 2019/0086931 A1 * | 3/2019 | Templeton | G01S 7/4802 |
| 2019/0094196 A1 * | 3/2019 | Park | H04B 17/3912 |
| 2019/0242710 A1 * | 8/2019 | Irish | G01S 19/22 |
| 2019/0346530 A1 * | 11/2019 | Zlogar | G01S 3/14 |
| 2020/0169895 A1 * | 5/2020 | Chen | G06N 3/045 |
| 2020/0186266 A1 * | 6/2020 | Wan | H04B 17/336 |
| 2020/0233094 A1 * | 7/2020 | Kumar | G05D 1/0278 |
| 2021/0064043 A1 * | 3/2021 | Kulkarni | G05D 1/028 |
| 2021/0103289 A1 * | 4/2021 | Templeton | G05D 1/0231 |
| 2021/0124057 A1 * | 4/2021 | Luo | G01S 19/21 |
| 2021/0144525 A1 | 5/2021 | Yoo et al. | |
| 2021/0274356 A1 * | 9/2021 | Liu | G06N 3/04 |
| 2022/0103271 A1 * | 3/2022 | Wan | H04B 17/346 |
| 2022/0165020 A1 * | 5/2022 | Kroon | H04N 19/88 |
| 2022/0357751 A1 * | 11/2022 | Thomson | G01S 19/14 |
| 2022/0374023 A1 * | 11/2022 | Templeton | G01S 17/89 |
| 2023/0039554 A1 * | 2/2023 | Chen | G06V 10/764 |
| 2023/0087702 A1 * | 3/2023 | Carnahan | G06V 20/56 382/154 |
| 2023/0242127 A1 * | 8/2023 | Bacchus | B60W 40/02 701/1 |
| 2024/0249473 A1 * | 7/2024 | Carnahan | G01C 11/02 |

FOREIGN PATENT DOCUMENTS

| | | | | |
|---|---|---|---|---|
| CN | 114341760 A | * | 4/2022 | .......... A01D 34/008 |
| CN | 116558532 A | * | 8/2023 | .......... B60W 40/105 |
| CN | 117395700 A | * | 1/2024 | |
| EP | 2148447 A1 | | 1/2010 | |
| EP | 3999928 B1 | * | 2/2024 | .......... A01D 34/008 |
| WO | WO-2015126499 A2 | * | 8/2015 | .......... G01C 21/005 |
| WO | 2020065384 A1 | | 4/2020 | |
| WO | 2020218717 A1 | | 10/2020 | |
| WO | WO-2021040471 A1 | * | 3/2021 | .......... A01D 34/008 |

* cited by examiner

| 2-BIT BINARY | PIXEL RATIO |
|---|---|
| OPEN SKY | 6.7% |
| CANOPY | 93.3% |

| SIGNAL IMPAIRMENT (dB) | FOLIAGE % |
|---|---|
| 0.5 | 20 |
| 0.75 | 30 |
| 1 | 40 |
| 2 | 50 |
| 3 | 60 |
| 4 | 70 |
| 5 | 80 |
| 6 | 90 |

CANOPY COVERAGE DETERMINATION FOR IMPROVED WIRELESS CONNECTIVITY

CROSS-REFERENCE TO RELATED APPLICATIONS

This application claims the benefit of U.S. Provisional Application No. 63/245,056, filed Sep. 16, 2021, entitled "Canopy Coverage Determination for Improved Wireless Connectivity," and U.S. Provisional Application No. 63/245,099, filed Sep. 16, 2021, entitled "Efficient Communication in Limited Resource Environments," each of which is incorporated by reference in its entirety for all purposes.

BACKGROUND

The present disclosure relates generally to wireless communication and more specifically to improving wireless communication where obstructions that may affect communication signals exist.

In certain environments, such as remote and/or wooded areas, a mobile communication device may not be able to access certain communication devices, such as cellular towers, WiFi routers, and the like, to transmit and/or receive data. Instead, the mobile communication device may communicate with other communication devices, such as communication hubs or nodes located in areas with a clearer line of sight, such as those located at higher altitudes, in unobstructed locations from the standpoint of the mobile communication device, and so on, to transmit and/or receive data. However, as may be the case in such environments, obstructions, such as a forest canopy or foliage, may decrease signal power and/or quality (e.g., by attenuating a signal transmitted by and/or to the mobile communication device), sometimes to the point of blocking the signal.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method performed by a mobile communication device includes capturing images using a camera of the mobile communication device, generating a spherical upper hemisphere grid based on the images, and determining a degree of obstruction for one or more regions of the spherical upper hemisphere grid. The method also includes adjusting one or more operating characteristics for communicating with one or more communication hubs based on a position of the one or more communication hubs corresponding to the one or more of the regions and the degree of obstruction at the one or more of the regions.

In another embodiment, one or more tangible, non-transitory, computer-readable media includes instructions that cause one or more processors to receive multiple images, generate a portion of a spherical grid based on the images, and determine foliage quantities for regions of the portion of the spherical grid. The instructions also cause the one or more processors to determine one or more communication node positions corresponding to the regions, and adjust one or more operating characteristics based on the one or more communication node positions and the foliage quantities for the regions.

In yet another embodiment, an electronic device includes a camera, one or more antennas, a transceiver that sends and receives signals via the one or more antenna, and processing circuitry communicatively coupled to the transceiver. The processing circuitry causes the camera to capture images, generates a spherical upper hemisphere grid based on the images, and determines an amount of foliage for regions of the spherical upper hemisphere grid. The processing circuitry also determines one or more positions of one or more additional electronic devices corresponding to one or more regions, and adjusts one or more operating characteristics of the transceiver based on the one or more positions of the one or more additional electronic devices and the amount of foliage at the one or more regions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
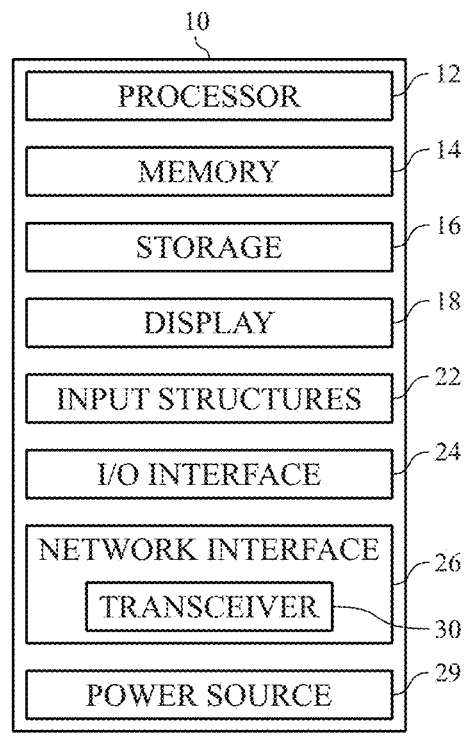
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to improving wireless communication where obstructions that may affect communication signals exist. In particular, in certain environments, such as remote and/or wooded areas, a mobile communication device may not be able to access certain communication devices, such as cellular towers, WiFi routers, and the like, to transmit and/or receive data. Instead, the mobile communication device may communicate with other communication devices, such as communication hubs or nodes located in areas with a clearer line of sight, such as those located at higher altitudes, in unobstructed locations from the standpoint of the mobile communication device, and so on, to transmit and/or receive data. However, as typical in such environments (e.g., when hiking, camping, hunting, fishing, and so on), obstructions, such as a forest canopy or foliage, may decrease signal quality (e.g., attenuate a signal transmitted and/or received by the mobile communication device), impairing a link budget of the mobile communication device, and sometimes to the point of blocking the signal. This may be particularly significant in emergency situations, such as when someone has injured themselves in the remote and/or wooded area, but the mobile communication device cannot communicate to request assistance due to heavy foliage. Exacerbating the issue is the fact that the mobile communication device may continue to attempt to transmit, even though a communication link cannot be established with a communication hub or other mobile communication device, which may waste valuable battery power (possibly preventing a subsequent communication when the communication link is finally established).

Embodiments herein provide various apparatuses and techniques to determining locations of obstructions (e.g., foliage) and adjusting operating characteristics (e.g., communication operating characteristics) based on the obstructions. To do so, the embodiments disclosed herein include capturing images via one or more cameras or light sensors of the mobile communication device, processing the images to determine obstructed (e.g., by foliage) portions and unobstructed (e.g., open sky) portions of the images, and generating a grid indicating the obstructed and unobstructed portions. The device may then adjust operating characteristics, such as synchronizing with a communication hub or other mobile communication device, performing a handover with the communication hub or other mobile communication device, determining transmission power or an amount to increase transmission power, selecting an antenna, determining a beam direction, determining a discontinuous reception (DRX) cycle or a frequency for receiving data, providing an indication (e.g. to a user) to stop or proceed through certain geographical areas (e.g., to take advantage of areas with higher signal quality or avoid areas with lower signal quality), and the like, based on the obstructed and unobstructed portions identified in the grid.

FIG. 1 is a block diagram of an electronic device or mobile communication device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite connection (e.g., via a satellite network), and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultrawideband (UWB) network, alternating current (AC) power lines, and so forth.

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
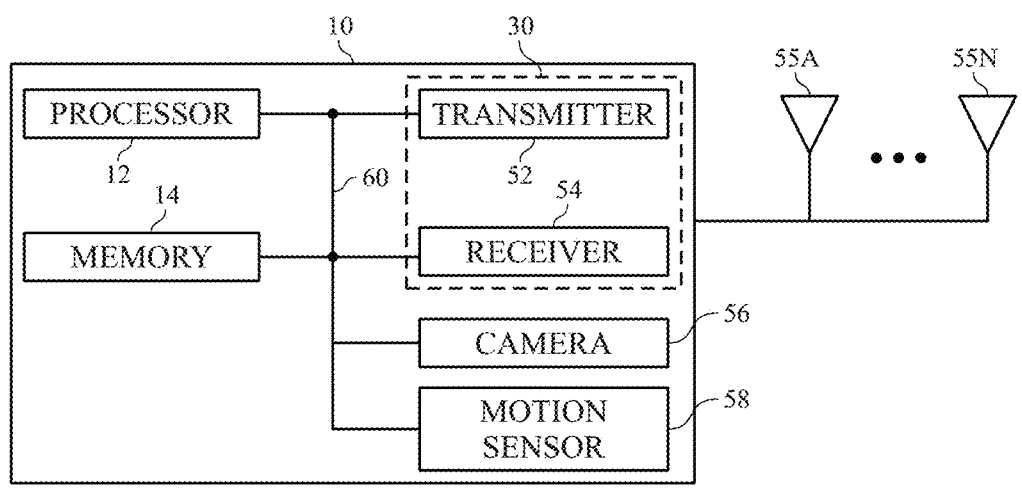
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

The electronic device 10 may also include one or more cameras, image capture devices, or light sensors (e.g., as part of the input structures 22). The one or more cameras or light sensors (collectively referred to as "a camera 56" herein) may capture images or determine amounts of light surrounding the electronic device 10. In some embodiments, the camera 56 may include a front-facing camera (e.g., disposed on a display surface of the electronic device 10) and a rear-facing camera (e.g., disposed on a base or back surface, opposite the display surface, of the electronic device 10).

The electronic device 10 may include one or more motion sensors 58 (e.g., as part of the input structures 22). The one or more motion sensors (collectively referred to as "a motion sensor 58" herein) may include an accelerometer, gyroscope, gyrometer, and the like, that detect or facilitate determining an orientation (e.g., including pitch, yaw, roll, and so on) of the electronic device 10.

As illustrated, the various components of the electronic device 10 may be coupled together by a bus system 60. The bus system 60 may include a data bus, for example, as well as a power bus, a control signal bus, and a status signal bus, in addition to the data bus. The components of the electronic device 10 may be coupled together or accept or provide inputs to each other using some other mechanism.

Embodiments herein provide various apparatuses and techniques to determining locations of obstructions (e.g., foliage) and adjusting operating characteristics based on the obstructions. To do so, the electronic device 10 may capture images via the camera 56, process the images to determine obstructed (e.g., by foliage) portions and unobstructed (e.g., open sky) portions of the images, and generate a grid indicating the obstructed and unobstructed portions. The electronic device 10 may then adjust operating characteristics, such as synchronizing with a communication hub or other electronic device, performing a handover with the communication hub or other electronic device, determining transmission power or an amount to increase transmission power, selecting an antenna 55, determining a beam direction, determining a discontinuous reception (DRX) cycle or a frequency for receiving data, providing an indication (e.g. to a user) to stop or proceed through certain geographical areas (e.g., to take advantage of areas with higher signal quality or avoid areas with lower signal quality), and the like, based on the obstructed and unobstructed portions identified in the grid.

Figure 3:
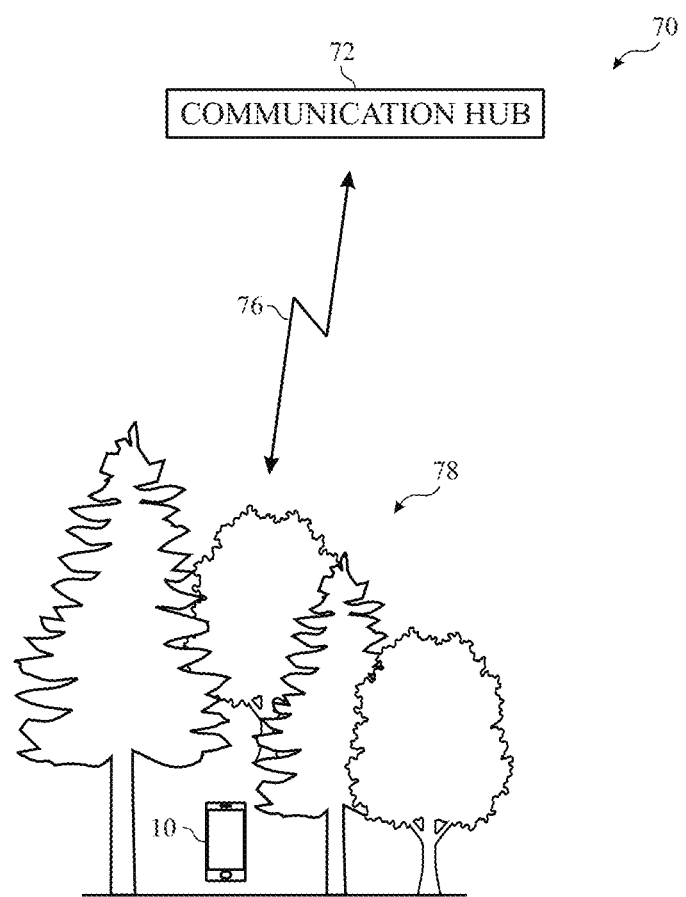
FIG. 3 is a perspective diagram of a communication system including the electronic device of FIG. 1, according to embodiments of the present disclosure.

FIG. 3 is a perspective diagram of a communication system 70 including the electronic device 10, according to embodiments of the present disclosure. As illustrated, the electronic device 10 may attempt to communicate (e.g., send and/or receive data) with a communication hub or node 72. The communication hub 72 may include any device or system that may communication with the electronic device 10 (e.g., a base station, a router, another electronic device, a high altitude base station, a satellite, a ground station, and on) and/or enable the electronic device to send and/or receive data to or from a communication network (e.g., a cellular network, a local network, the Internet, a non-terrestrial network, satellite network, another electronic device, and on). For example, the communication hub 72 may establish a communication channel with the electronic device 10, receive requests for data from the electronic device 10, and send data to the electronic device 10 based on the requests.

However, as illustrated, in some cases, a communication path 76 between the electronic device 10 and the communication hub 72 may be at least partially obstructed by one or more obstructions, such as canopy cover or foliage 78. That is, the foliage 78 may attenuate communication signals sent from the electronic device 10 to the communication hub 72 or from the communication hub 72 to the electronic device 10, impairing a link budget of the receiver 54 of the electronic device 10, and sometimes to the point of blocking the signals. The link budget of the receiver 54 refers to a receiving power of the receiver 54 as defined by a transmitting power of the communication hub 72 with any communication gains added and any communication losses subtracted. If the link budget or receiving power is greater or equal to zero (such that the transmitting power of the communication hub 72 and the communication gains are greater than or equal to any communication losses), then a communication link between the receiver 54 of the electronic device 10 and the communication hub 72 may be established and is considered "closed." If the link budget is less than zero (such that the transmitting power of the communication hub 72 and the communication gains are less than any communication losses), then the communication link may not be established and is considered "open."

In cases of cellular communication, the link budget of the receiver 54 may be on the order of 30-40 decibels (dB). However, certain practices decrease the link budget of receiving devices to maintain them in out-of-service states for extended durations, such that communication decisions may not be made by the receiving devices. For example, the link budget of the receiver 54 may be on the order of 4-8 dB. As such, obstructions causing additional losses to the link budget of the receiver 54 when communicating with a communication hub 72 may be more likely to significantly affect signal power and/or quality, to the point of preventing establishment or disconnecting a communication link, when compared cellular communication. While a specific communication hub 72 is illustrated in FIG. 3 and mentioned throughout this disclosure, it should be understood that the disclosed embodiments may apply to any communication link established or attempted to be established by the electronic device 10, such as with another electronic device (e.g., a mobile communication device, a router, and so on), for which determining obstructions between the electronic device 10 and the other electronic device may facilitate establishing the communication link. For example, the disclosed embodiments may apply to a situation where the electronic device 10 is at a lower elevation (e.g., in a valley), the other electronic device is at a higher elevation (e.g., on a cliff), and a forest canopy is disposed between the electronic device 10 and the other electronic device, thus potentially obstructing a communication link between the electronic device 10 and the other electronic device.

Figure 5:
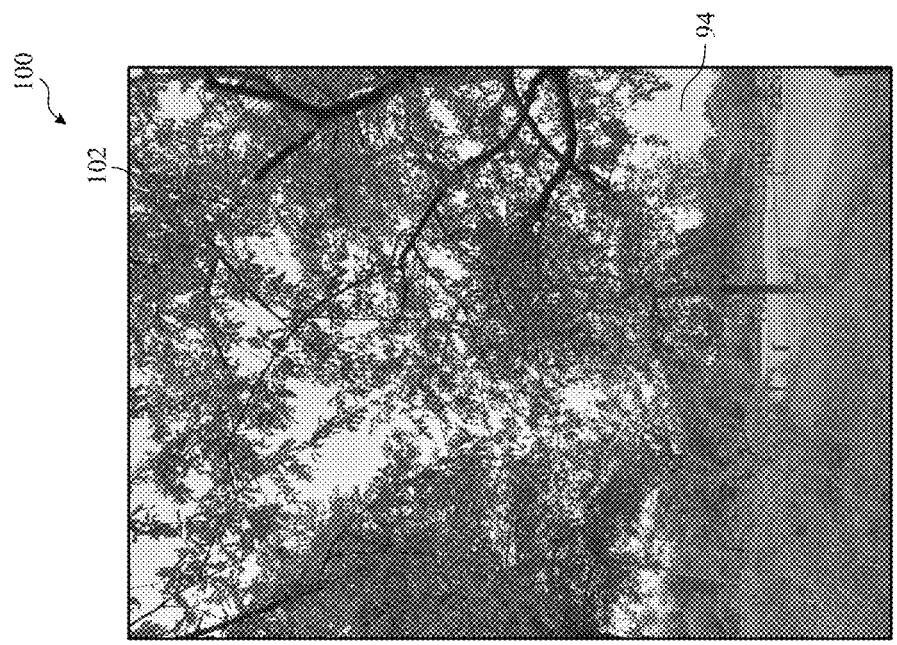
FIG. 5 is an image of medium foliage taken by a camera of the electronic device of FIG. 1, according to embodiments of the present disclosure.
Figure 4:
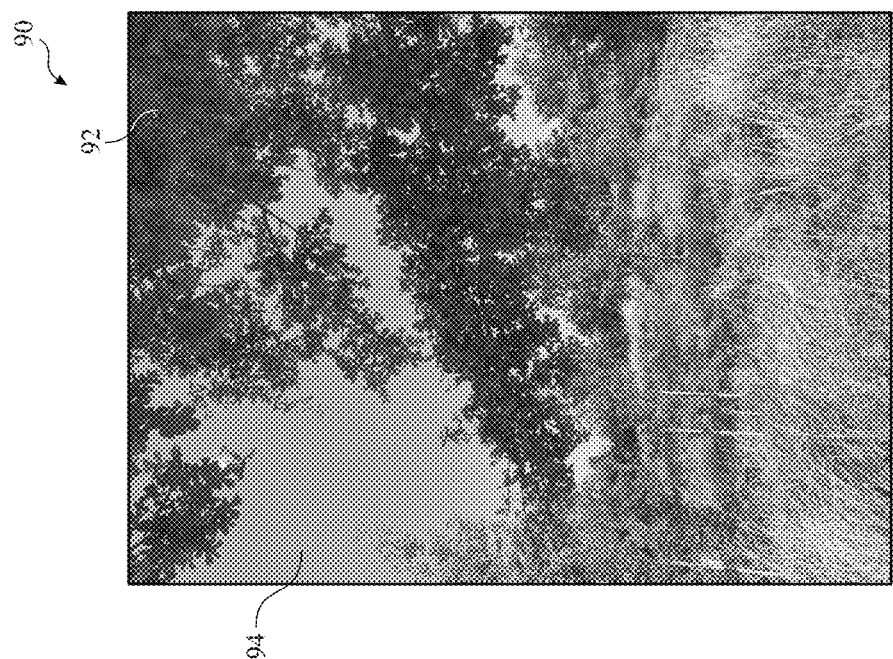
FIG. 4 is an image of light foliage taken by a camera of the electronic device of FIG. 1, according to embodiments of the present disclosure.
Figure 6:
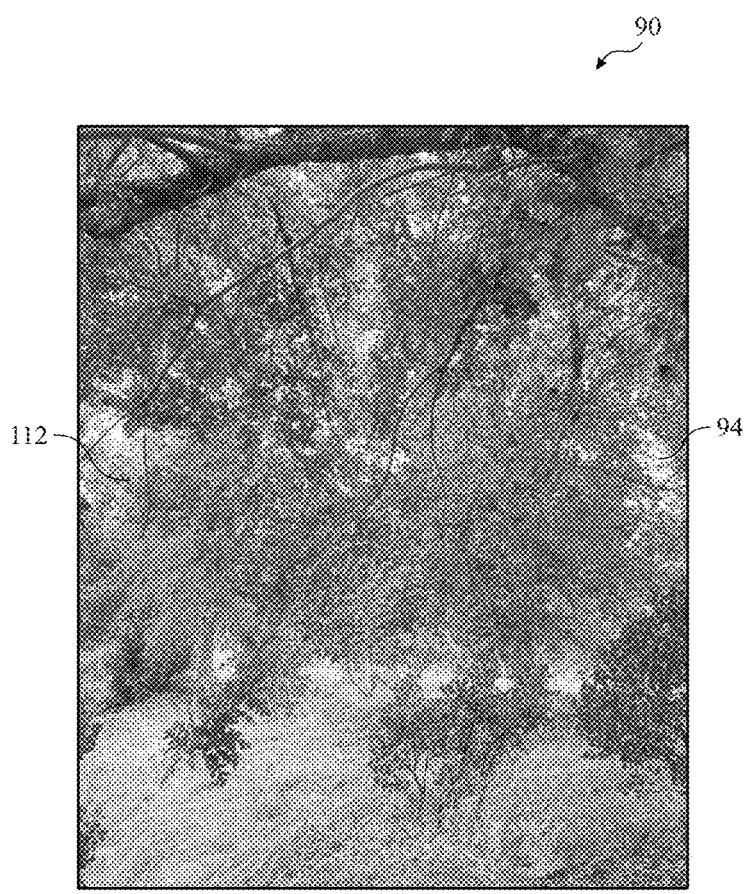
FIG. 6 is an image of heavy foliage taken by a camera of the electronic device of FIG. 1, according to embodiments of the present disclosure.

The greater amount or percentage of the sky covered by foliage (e.g., the greater the degree of obstruction), the greater the impairment on communication signals to and from the electronic device 10. FIGS. 4-6 are example images taken by a camera 56 of the electronic device 10 illustrating different foliage densities, according to embodiments of the present disclosure. In particular, FIG. 4 is an image 90 of light foliage 92 taken by the camera 56 of the electronic device 10, according to embodiments of the present disclosure. The terms "light foliage," "medium foliage," and "heavy foliage" are relative, and may apply to any suitable amounts or percentages of foliage. As an example, light foliage may refer to when foliage covers between 0% and 33% of the sky as captured in an image, medium foliage may refer to when foliage covers between 34% and 66% of the sky as captured in an image, and heavy foliage may refer to when foliage covers between 67% and 100% of the sky as captured in an image. More or less coverage categories may be defined (e.g., "medium light foliage," "medium heavy foliage," and so on). As an illustrative example, the light foliage 92 of the image 90 of FIG. 4 may cover approximately 30% of the sky 94.

As another example, FIG. 5 is an image 100 of medium foliage 102 taken by the camera 56 of the electronic device 10, according to embodiments of the present disclosure. The medium foliage 102 of FIG. 5 may cover approximately 70% of the sky 94. As yet another example, FIG. 6 is an image 110 of heavy foliage 112 taken by the camera 56 of the electronic device 10, according to embodiments of the present disclosure. The heavy foliage 112 of FIG. 5 may cover approximately 90% of the sky 94.

Figure 7:
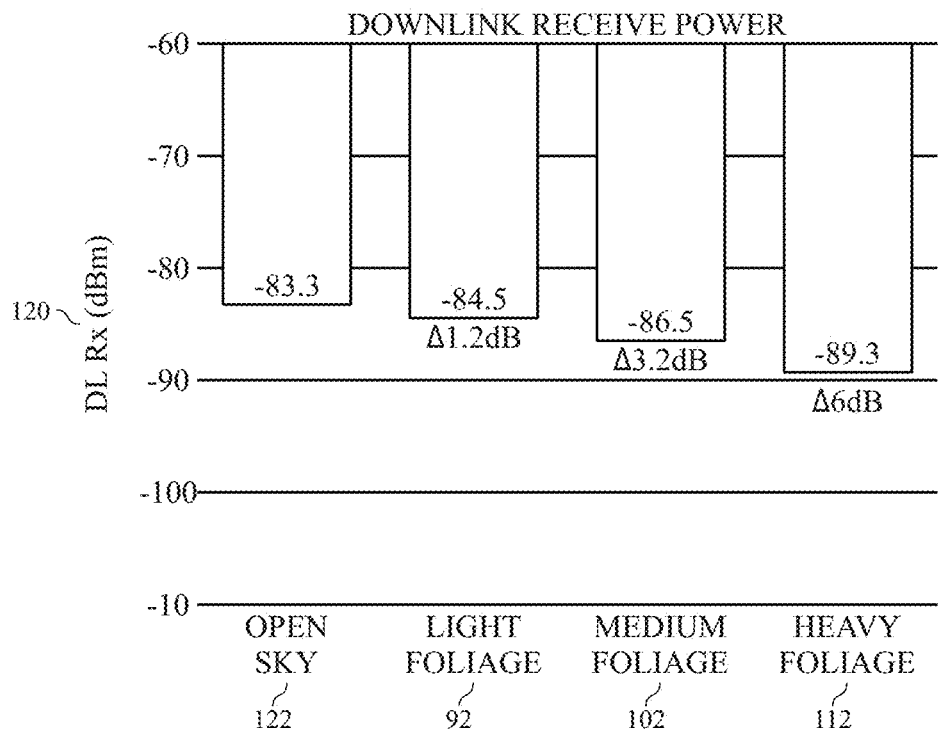
FIG. 7 is a bar graph of downlink receive power of a receiver of the electronic device of FIG. 1, according to embodiments of the present disclosure.

FIG. 7 is a bar graph showing downlink receive power 120 (in decibels per milliwatt (dBm)) of the receiver 54 of the electronic device 10, according to embodiments of the present disclosure. In an open sky condition 122, such as when foliage is approximately 0%, less than or equal to 5%, less than or equal to 10%, or any other suitable definition where foliage does not cause significant impairment to downlink receive power 120 (e.g., where foliage causes less than or equal to 1 dB impairment to downlink receiver power 120), the downlink receiver power 120 of the receiver 54 may be −83.3 dBm. This downlink receiver power 120 may be used as a baseline, as there is no or insufficient foliage to significantly impair the downlink receiver power 120. In the light foliage condition 92, such as when foliage is approximately 33%, the downlink receiver power 120 of the receiver 54 may be −84.5 dBm. Accordingly, the light foliage condition 92 causes 1.2 dB impairment to the downlink receiver power 120.

In the medium foliage condition 102, such as when foliage is approximately 66%, the downlink receiver power 120 of the receiver 54 may be −86.5 dBm. Accordingly, the medium foliage condition 102 causes 3.2 dB impairment to the downlink receiver power 120. In the heavy foliage condition 112, such as when foliage is approximately 100%, the downlink receiver power 120 of the receiver 54 may be −89.3 dBm. Accordingly, the heavy foliage condition 112 causes 6 dB impairment to the downlink receiver power 120. As mentioned above, one example of the link budget of the receiver 54 of the electronic device 10, when receiving signals from certain communication hubs 72, may be on the order of 4-8 dB. Accordingly, any presence of foliage, from light to heavy, may impair the downlink receiver power 120 by 1 to 6 dB. As shown, the heavy foliage condition 112 that may cause 6 dB impairment to the downlink receiver power 120 may completely take up the link budget, thus preventing a communication link between the receiver 54 and the communication hub 72 from closing or being established. Indeed, even the medium foliage condition 102 that may cause a 3.2 dB impairment to the downlink receiver power 120 may significantly impair the link budget of the receiver 54, possibly causing the electronic device 10 to lose wireless connectivity. It should be understood that the downlink receiver powers 120 of the open sky condition 122, the light foliage condition 92, the medium foliage condition 102, the heavy foliage condition 112, as illustrated in FIG. 7, are illustrative, and may be different from device-to-device or application-to-application.

Figure 8:
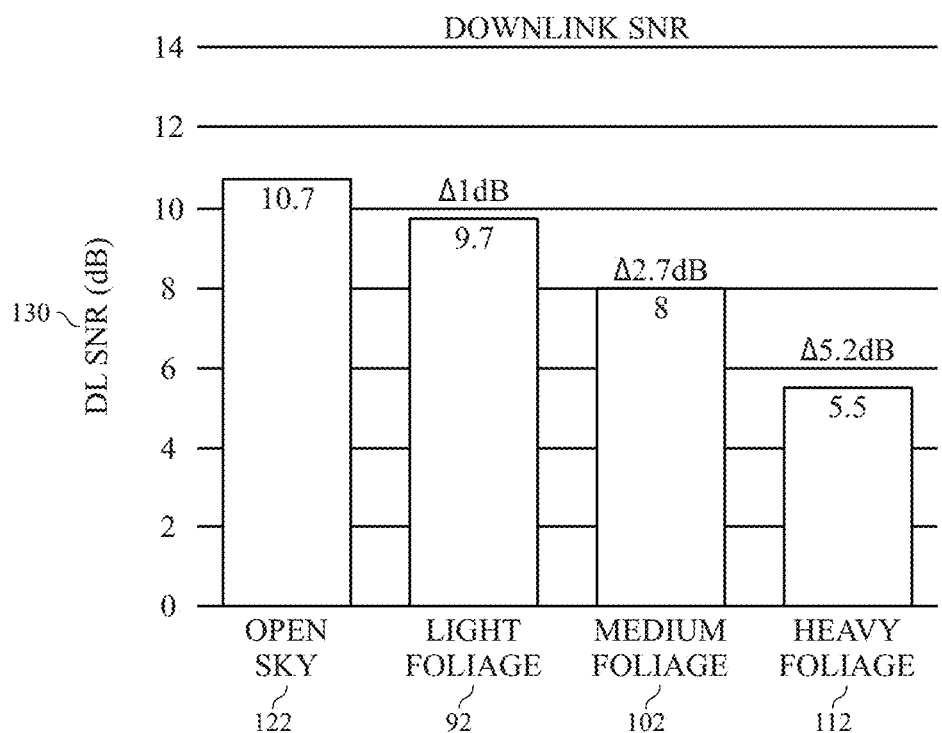
FIG. 8 is a bar graph showing downlink signal-to-noise ratio of a receiver of the electronic device of FIG. 1, according to embodiments of the present disclosure.

Similarly, FIG. 8 is a bar graph showing downlink signal-to-noise ratio (SNR) 130 (in dB) of the receiver 54 of the electronic device 10, according to embodiments of the present disclosure. In the open sky condition 122, the downlink SNR 130 of the receiver 54 may be 10.7 dB. This downlink SNR 130 may be used as a baseline, as there is no or insufficient foliage to significantly impair the downlink SNR 130. In the light foliage condition 92, the downlink SNR 130 of the receiver 54 may be 9.7 dB. Accordingly, the light foliage condition 92 causes 1 dB impairment to the downlink SNR 130. In the medium foliage condition 102, the downlink SNR 130 of the receiver 54 may be 8 dB. Accordingly, the medium foliage condition 102 causes 2.7 dB impairment to the downlink SNR 130. In the heavy foliage condition 112, the downlink SNR 130 of the receiver 54 may be 5.5 dB. Accordingly, the heavy foliage condition 112 causes 5.2 dB impairment to the downlink SNR 130.

As such, the heavy foliage condition 112 may significantly impair signal quality of the signals received by the receiver 54 by degrading the downlink SNR 130 by 5.2 dB, and even the medium foliage condition 102 may degrade the downlink SNR 130 by 2.7 dB. It should be understood that the downlink SNRs 130 of the open sky condition 122, the light foliage condition 92, the medium foliage condition 102, the heavy foliage condition 112, as illustrated in FIG. 8, are illustrative, and may be different from device-to-device or application-to-application.

Figure 9:
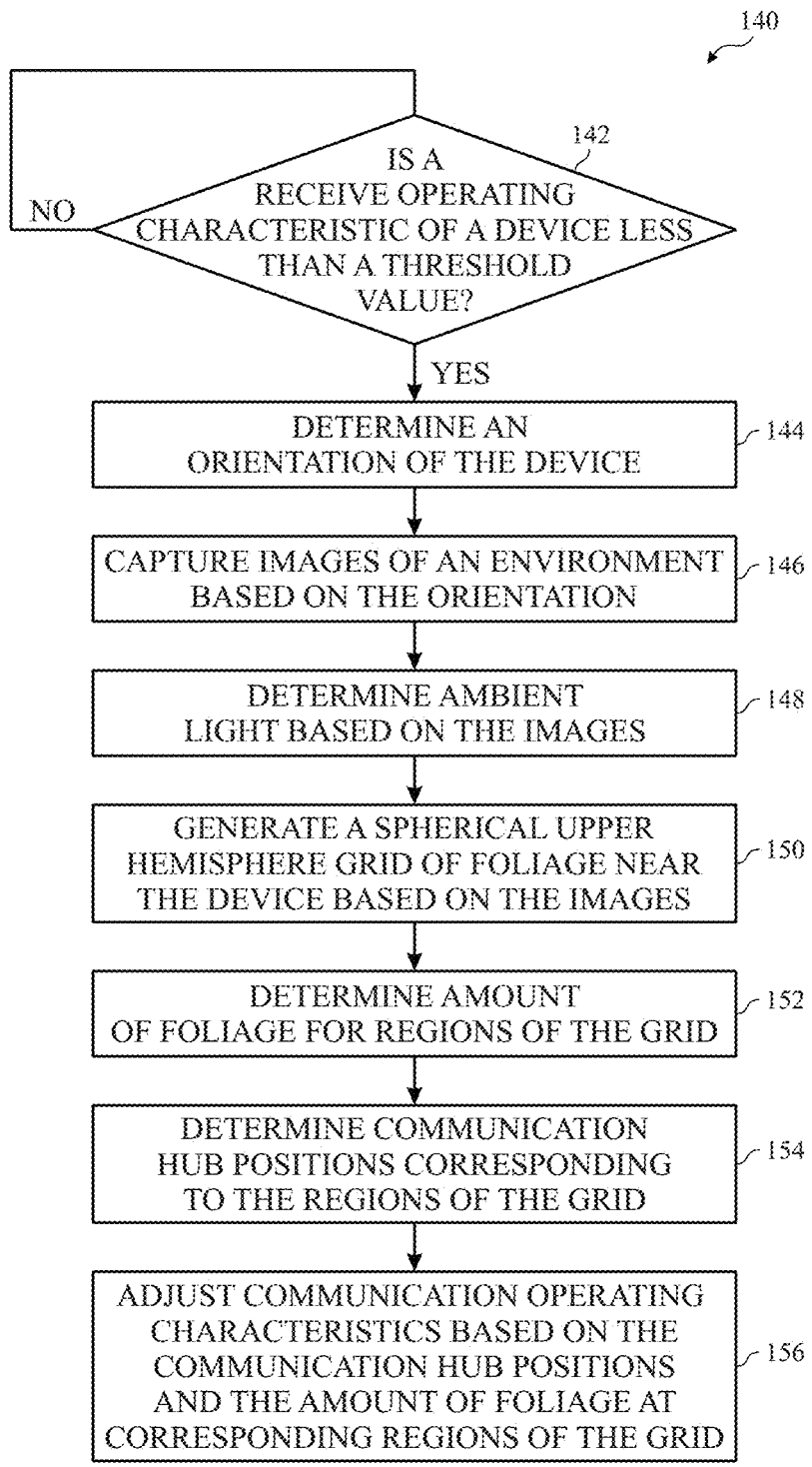
FIG. 9 is a flowchart of a method for improving wireless connectivity and/or communication based on foliage or other obstructions near or around the electronic device of FIG. 1, according to embodiments of the present disclosure.

FIG. 9 is a flowchart of a method 140 for improving wireless connectivity and/or communication based on foliage or other obstructions near or around the electronic device 10, according to embodiments of the present disclosure. Any suitable device (e.g., a controller) that may control components of the electronic device 10, such as the processor 12, may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components, such as an operating system of the electronic device 10, one or more software applications of the electronic device 10, and the like. While the method 140 is described using steps in a specific sequence, it should be understood that the present disclosure contemplates that the described steps may be performed in different sequences than the sequence illustrated, and certain described steps may be skipped or not performed altogether.

In some embodiments, the processor 12 may perform the method 140 in response to certain triggering events occurring related to communication operations of the electronic device 10 and/or transceiver 30, such as synchronizing with a communication hub 72 or other electronic device, performing a handover with the communication hub 72 or other electronic device, determining transmission power or an amount to increase transmission power, selecting an antenna 55, determining a beam direction, determining a discontinuous reception (DRX) cycle or a frequency for receiving data, and the like. Moreover, in some embodiments, the electronic device 10 may have established a communication link with the communication hub 72 or other electronic device (e.g., to download or upload data, exchange text (e.g., Short Message Service (SMS) messages), perform voice communication, and so on).

In decision block 142, the processor 12 determines whether a receive operating characteristic of the electronic device 10 is less than a threshold value. The receive operating characteristic may include a power level of a received signal at the receiver 54 (e.g., a Received Signal Strength Indicator (RSSI), a Reference Signal Received Power (RSRP), an Arbitrary Strength Unit (ASR), and the like), a signal quality of the received signal (e.g., a Reference Signal Received Quality (RSRQ), a Signal to Interference plus Noise Ratio (SINR), a Signal to Noise plus Interference Ratio (SNIR), a Signal to Noise Ratio (SNR), and the like), and so on. The threshold value may indicate a sufficiently powerful or good quality signal. In some embodiments, the threshold value may indicate a limited link budget, such that if foliage near the electronic device 10 adds to signal loss, then a communication link between the electronic device and a communication hub 72 may not be established. Using the example of FIG. 7, the receive operating characteristic may include downlink receive power 120, and the threshold value may be any value between 0.5 and 10 dB (e.g., 1 dB) less than the baseline downlink receive power 120 of −83.3. Using the example of FIG. 8, the receive operating characteristic may include downlink SNR 130, and the threshold value may be any value between 0.5 and 10 dB (e.g., 1 dB) less than the baseline downlink SNR 130 of 10.7 dB.

If the receive operating characteristic is greater or equal to the threshold value, then the receive operating characteristic indicates a sufficiently powerful or good quality signal, and the processor 12 may repeat the determination of decision block 142. If the receive operating characteristic is less that the threshold value, then the processor 12 may proceed to process block 144.

Figure 10:
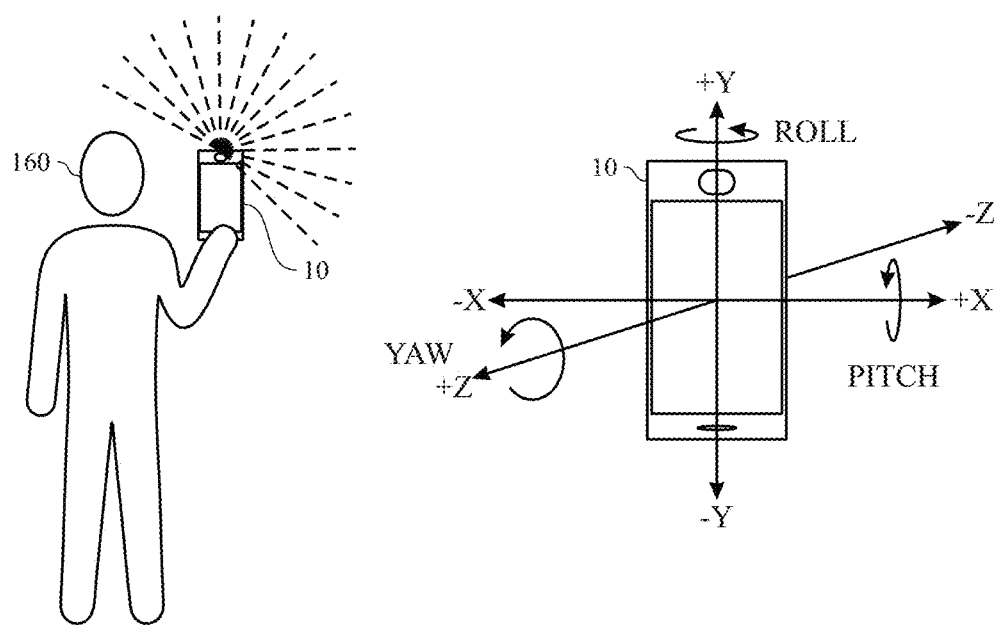
FIG. 10 is a perspective diagram of a user holding the electronic device of FIG. 1 and a motion sensor of the electronic device determining a pitch, yaw, and roll of the electronic device, according to embodiments of the present disclosure.

In process block 144, the processor 12 determines an orientation of the electronic device 10 (e.g., in three-dimensional space). In particular, the processor 12 may use the motion sensor 58 to determine, for example, a pitch, yaw, and/or roll of the electronic device 10. FIG. 10 is a perspective diagram of a user 160 holding the electronic device 10 and the motion sensor 58 determining a pitch, yaw, and roll of the electronic device 10, according to embodiments of the present disclosure. In particular, the electronic device 10 may be communicating with or attempting to communicate with the communication hub 72 or other electronic device, and the motion sensor 58 may determine the pitch, yaw, and roll of the electronic device 10 as the user 160 holds the electronic device 10. The pitch, yaw, and roll may be determined based on (e.g., about) three-dimensional axes (labeled as X-, Y-, and Z-axes) of the electronic device 10.

Figure 11:
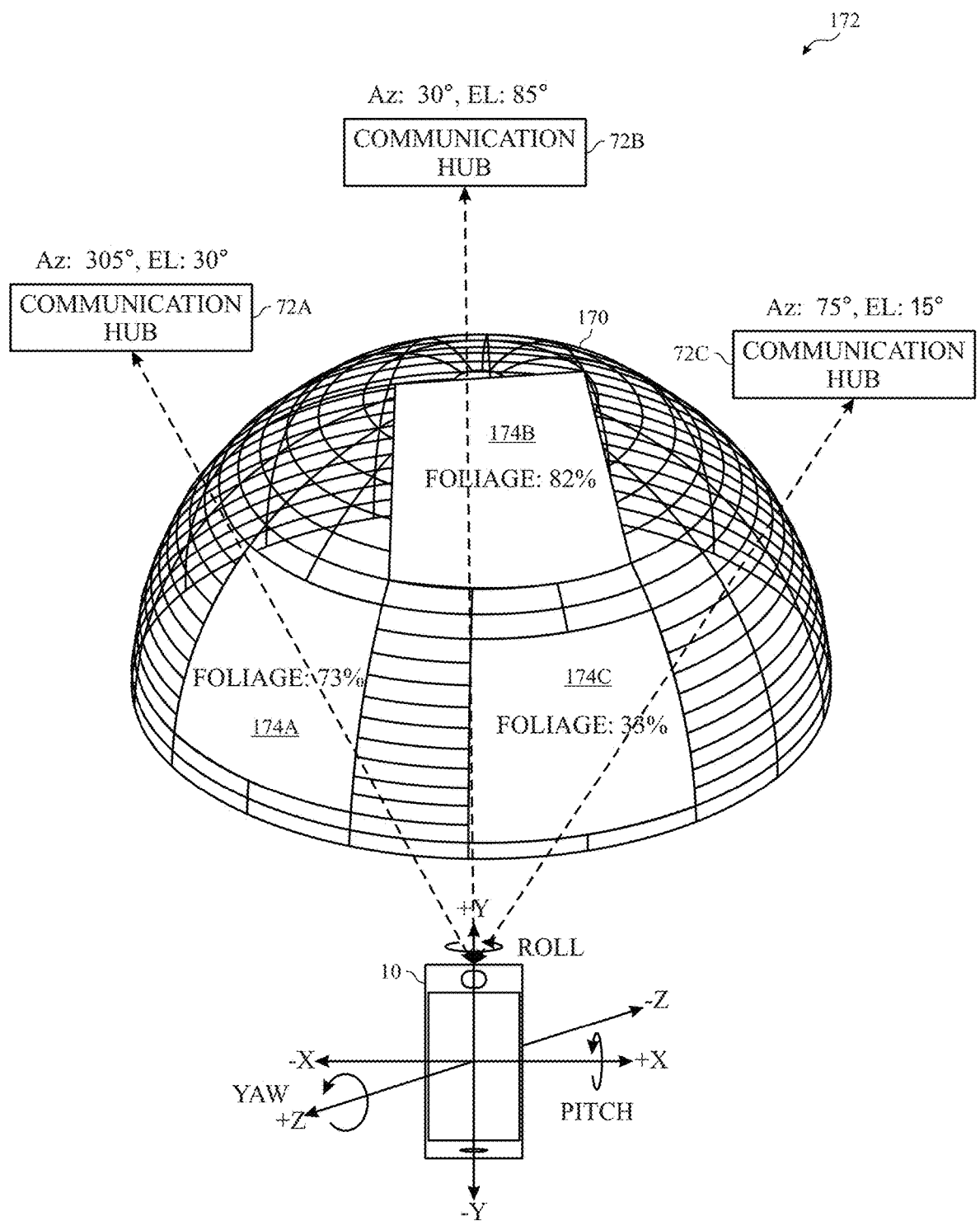
FIG. 11 is a perspective diagram of a spherical grid of an upper hemisphere near and/or around the electronic device of FIG. 1, according to embodiments of the present disclosure.

Returning to FIG. 9, in process block 146, the processor 12 captures images of an environment near and/or around the electronic device 10 based on the orientation of the electronic device 10 determined via the motion sensor 58. For example, the electronic device 10 may include a camera 56, and based on the orientation of the electronic device 10, may activate the camera 56 to capture images of an upper hemisphere near and/or around the electronic device 10. FIG. 11 is a perspective diagram of a spherical grid 170 of an upper hemisphere 172 near and/or around the electronic device 10, according to embodiments of the present disclosure. In some embodiments, based on how the user 160 is holding the electronic device 10, the processor 12 may display prompts on the display 18 of the electronic device 10 indicating to the user 160 to move and/or how to move the electronic device 10 to capture images to sufficiently cover or output the spherical grid 170 of the upper hemisphere 172. The processor 12 may determine directions and/or angles to move and/or tilt the electronic device 10 based on the orientation of the electronic device 10 as determined by the motion sensor 58 and/or placement of the camera 56 within the electronic device 10 (e.g., on a display surface of the electronic device 10, on a base or back surface, opposite the display surface, of the electronic device 10, near a top edge of the electronic device 10, and so on). In some embodiments, the processor 12 may execute an algorithm that determines what orientations that the electronic device 10 may be held to capture images to sufficiently cover or output the spherical grid 170 of the upper hemisphere 172 based on a current orientation of the electronic device 10 as determined by the motion sensor 58, the placement of the camera 56, and the images that have already been captured by the camera 56. While the grid 170 is described as spherical and representative of the upper hemisphere 172, it should be understood that any suitable shape and area that obstructions may affect radio frequency signals sent or received by the electronic device 10 are contemplated. Moreover, as illustrated, the term "spherical" may not imply a full sphere, but instead may refer to at least a portion (e.g., an upper half, a quarter, an eighth, and the like) of a sphere.

Returning to FIG. 9, in process block 148, the processor 12 determines ambient light based on the images. That is, the processor 12 may determine an amount of ambient light based on the amount of light captured in the images. In some embodiments, the processor 12 may determine the ambient light based on additional or alternative inputs, including time of day, using a light sensor of the electronic device 10, and so on. The determined amount of ambient light may facilitate determining an amount of foliage, as described in process block 152 below.

In process block 150, the processor 12 generates the spherical grid 170 of the upper hemisphere 172 of foliage near the electronic device 10, as illustrated in FIG. 11, based on the images. In particular, the processor 12 may combine or "stitch together" the images captured from process block 146 to generate the spherical grid 170 of the upper hemisphere 172 near the electronic device 10.

Figure 12:
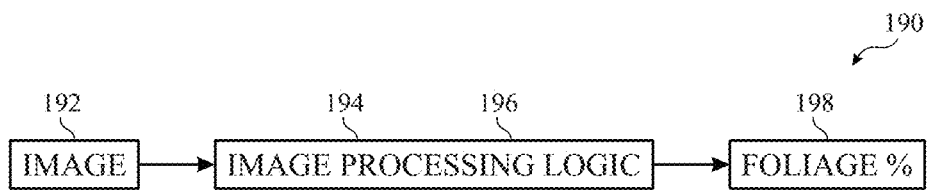
FIG. 12 is a block diagram of a process that determines an amount of foliage in a region of the spherical grid of FIG. 11, according to embodiments of the present disclosure.
Figure 13:
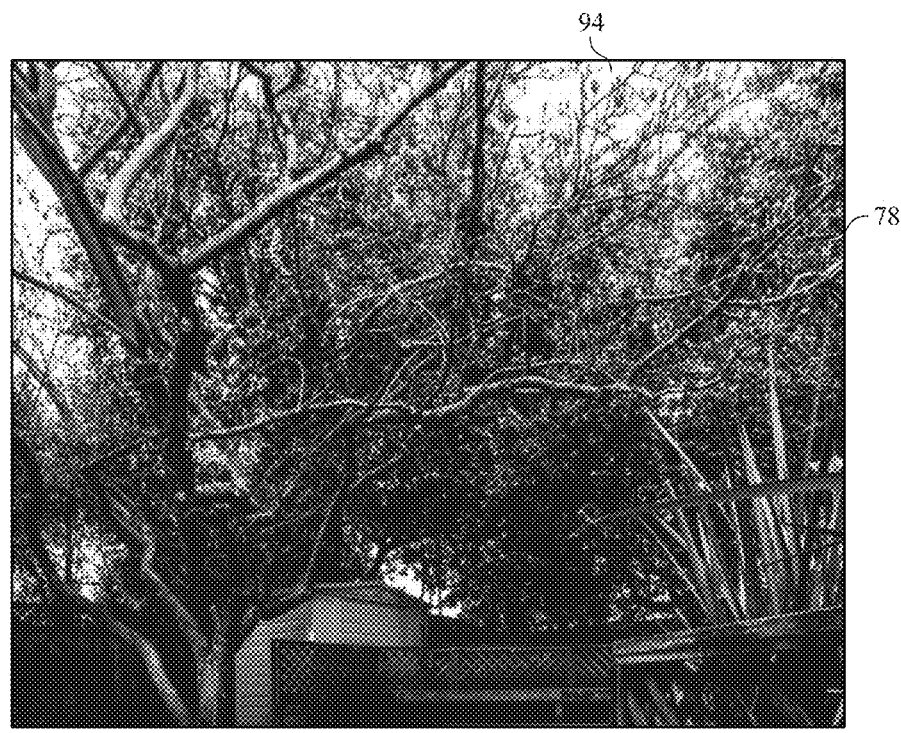
FIG. 13 is an image that corresponds to a region of the spherical grid of FIG. 11, according to embodiments of the present disclosure.

In process block 152, the processor 12 determines an amount of foliage for regions of the grid 170. That is, turning to FIG. 11, for each region 174 (e.g., individually referred to as 174A, 174B, 174C) of the grid 170, which may be composed of at least a portion of one or more images captured by the camera 56, the processor 12 may determine an amount of foliage present. FIG. 12 is a block diagram of a process 190 that determines an amount of foliage in a region 174 of the grid 170, according to embodiments of the present disclosure. In process block 192, the processor 12 may receive a portion of an image or images captured by the camera 56 that corresponds to a region 174 of the grid 170. As an illustrative example, FIG. 13 is an image that corresponds to a region 174 of the grid 170, according to embodiments of the present disclosure. The image includes portions of open sky 94 and foliage 78.

In process block 194, the processor 12 performs image processing techniques or algorithms on the portion of the image or images. In some embodiments, the electronic device 10 may include image processing logic 196 in the form of software (e.g., instructions stored on the memory 14), hardware (e.g., circuitry), or both, that the processor 12 may execute to perform image processing logic 196 on the portion of the image or images. The image processing logic 196 may identify open sky or foliage (e.g., leaves, branches, and so on) in the portion of the image or images, and represent open sky as a value, and foliage as a value. For example, open sky may be represented as a 0, and foliage as a 1. In particular, the image processing logic 196 may determine a brightness or amount of light in each pixel (or an average brightness of a group of pixels (e.g., a 2×2 group of pixels, a 4×4 group of pixels, a 6×4 group of pixels, or any other suitable grouping of pixels)), and, if the brightness is less than a threshold brightness that indicates the presence of foliage, may determine the pixel (or group of pixels) as open sky. If the brightness is greater or equal to the threshold brightness, then the image processing logic 196 may determine the pixel (or group of pixels) as foliage. In some embodiments, gradations of foliage may be represented by multiple values (e.g., light foliage that is less than a first threshold brightness that indicates the presence of light foliage may be represented as a 1, medium foliage that is less than a second threshold brightness that indicates the presence of medium foliage may be represented as a 2, heavy foliage that is less than a third threshold brightness that indicates the presence of heavy foliage may be represented as a 3, and so on).

In some embodiments, the processor 12 may determine the amount of foliage for each region 174 based on the ambient light determined in process block 148. That is, the threshold brightness to which a pixel or group of pixels is compared to determine whether the pixel or group of pixels indicates open sky or foliage may be adjusted (or the pixel brightness may be adjusted) based on the amount of ambient light. This may enable better accuracy by decreasing a number of false negatives or false positive when determining whether the pixel or group of pixels indicates open sky or foliage.

In some embodiments, the image processing logic 196 may include a machine-learning component or engine that is trained to determine different foliage types with high accuracy. As used herein, machine-learning may refer to algorithms and statistical models that computer systems (e.g., including the electronic device 10) use to perform a specific task with or without using explicit instructions. For example, a machine-learning process may generate a mathematical model based on a sample of data, known as "training data," in order to make predictions or decisions without being explicitly programmed to perform the task.

Depending on the inferences to be made, the image processing logic 196 may implement different forms of machine-learning. For example, in some embodiments (e.g., when particular known examples exist that correlate to future predictions or estimates that the machine-learning engine may be tasked with generating), the machine-learning engine may implement supervised machine-learning. In supervised machine-learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning engine may implement other machine-learning techniques, such as those based on estimated density and graph connectivity.

Figures 14, 15:
FIG. 14 is the image of FIG. 13 that has undergone image processing as described in FIG. 12, according to embodiments of the present disclosure.
FIG. 15 is a table of open sky percentage and foliage percentage of the image of FIG. 13 as determined by a processor of the electronic device of FIG. 1, according to embodiments of the present disclosure.

FIG. 14 is the image of FIG. 13 that corresponds to a region 174 of the grid 170 that has undergone the image processing 194 of FIG. 12, according to embodiments of the present disclosure. In particular, the portions of open sky 94 are represented by a 0 (and are depicted as white), while the portions of foliage 78 are represented by a 1 (and are depicted as black).

In process block 198, the processor 12 determines a foliage percentage based on the processed image. In particular, the processor 12 may determine an open sky percentage based on the number of open sky pixels compared to the number of total pixels of the image, and determine the foliage percentage based on the number of foliage pixels compared to the number of total pixels of the image. As mentioned above, in some embodiments, the foliage percentage may be further detailed into gradations of foliage (e.g., light foliage percentage, medium foliage percentage, heavy foliage percentage, and so on). Moreover, to increase efficiency and processing power, but at a possible cost of accuracy, the foliage percentage may be determined for groups of pixels rather than each pixel of the image (which may reduce the number of foliage determinations to be performed by the processor 12).

FIG. 15 is a table 210 of the open sky percentage and the foliage percentage of the image of FIG. 13 as determined by the processor 12, according to embodiments of the present disclosure. As indicated, the processor 12 determines that the open sky percentage of the image of FIG. 13 is 6.7%, and the foliage percentage is 93.3%. Based on the example provided above, where light foliage refers to when foliage covers between 0% and 33% of the sky as captured in an image, medium foliage refers to when foliage covers between 34% and 66% of the sky as captured in an image, and heavy foliage refers to when foliage covers between 67% and 100% of the sky as captured in an image, the processor 12 may determine that the image of FIG. 13 indicates heavy foliage.

Figure 16:
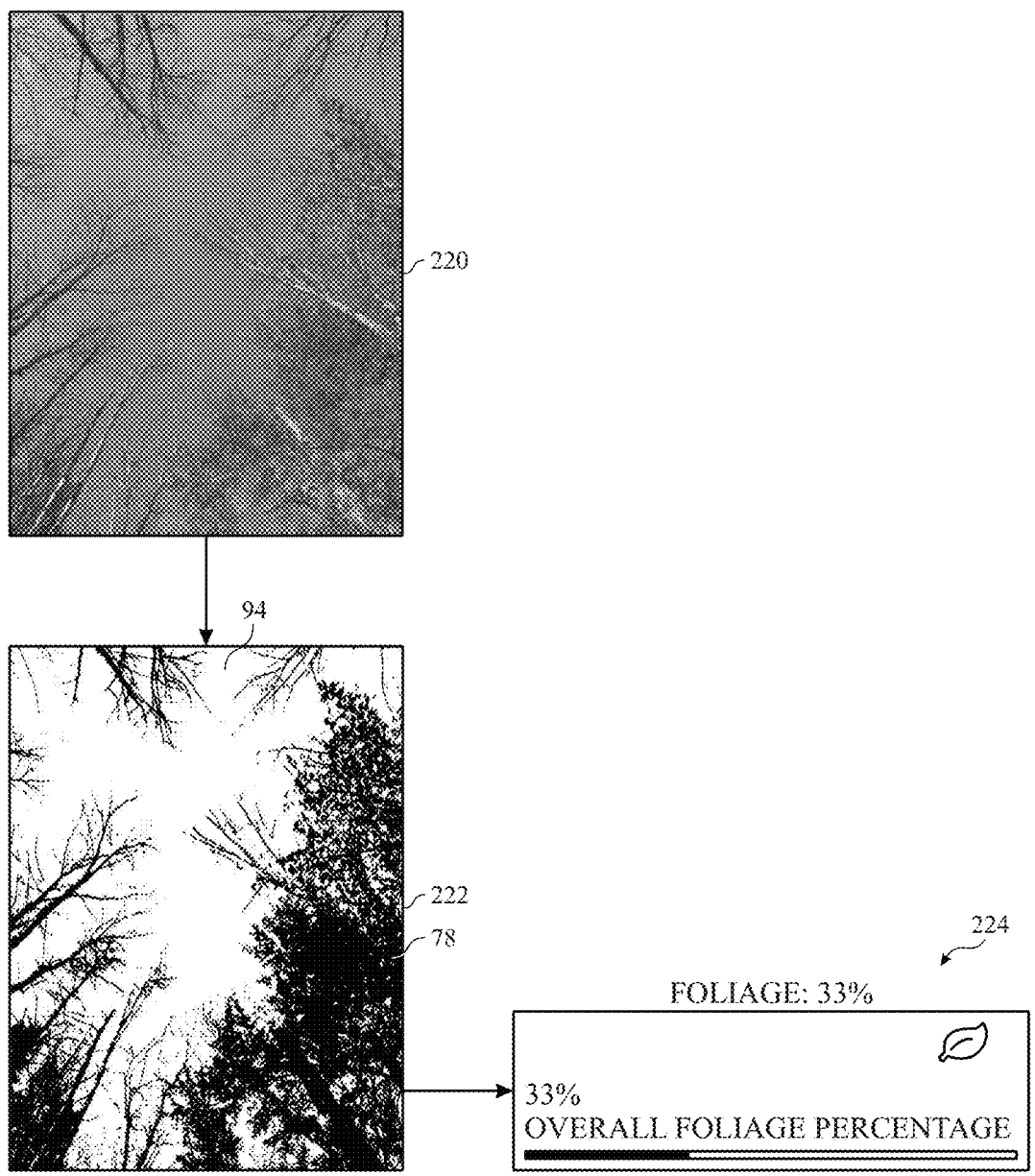
FIG. 16 is an example of a captured image, a processed image, and a foliage determination of light foliage, according to embodiments of the present disclosure.

FIG. 16 is another illustrative example of a captured image 220, a processed image 222, and a foliage determination 224 of light foliage, according to embodiments of the present disclosure. That is, a camera 56 of the electronic device 10 may capture the image 220, which may correspond to a region 174 of the spherical grid 170 of the upper hemisphere 172 near and/or around the electronic device 10. The image processing logic 194 may process the image 220 to generate the processed image 222, which represents open sky 94 as a 0 value (illustrated as white) and foliage 78 as a 1 value (illustrated as black). The processor 12 then determines, based on the processed image 222, that the region 174 corresponding to the image 220 has 33% foliage (e.g., the foliage determination 224). Based on the example provided above, where light foliage refers to when foliage covers between 0% and 33% of the sky as captured in an image, the processor 12 may determine that the image 220 of FIG. 16 indicates light foliage.

Figure 17:
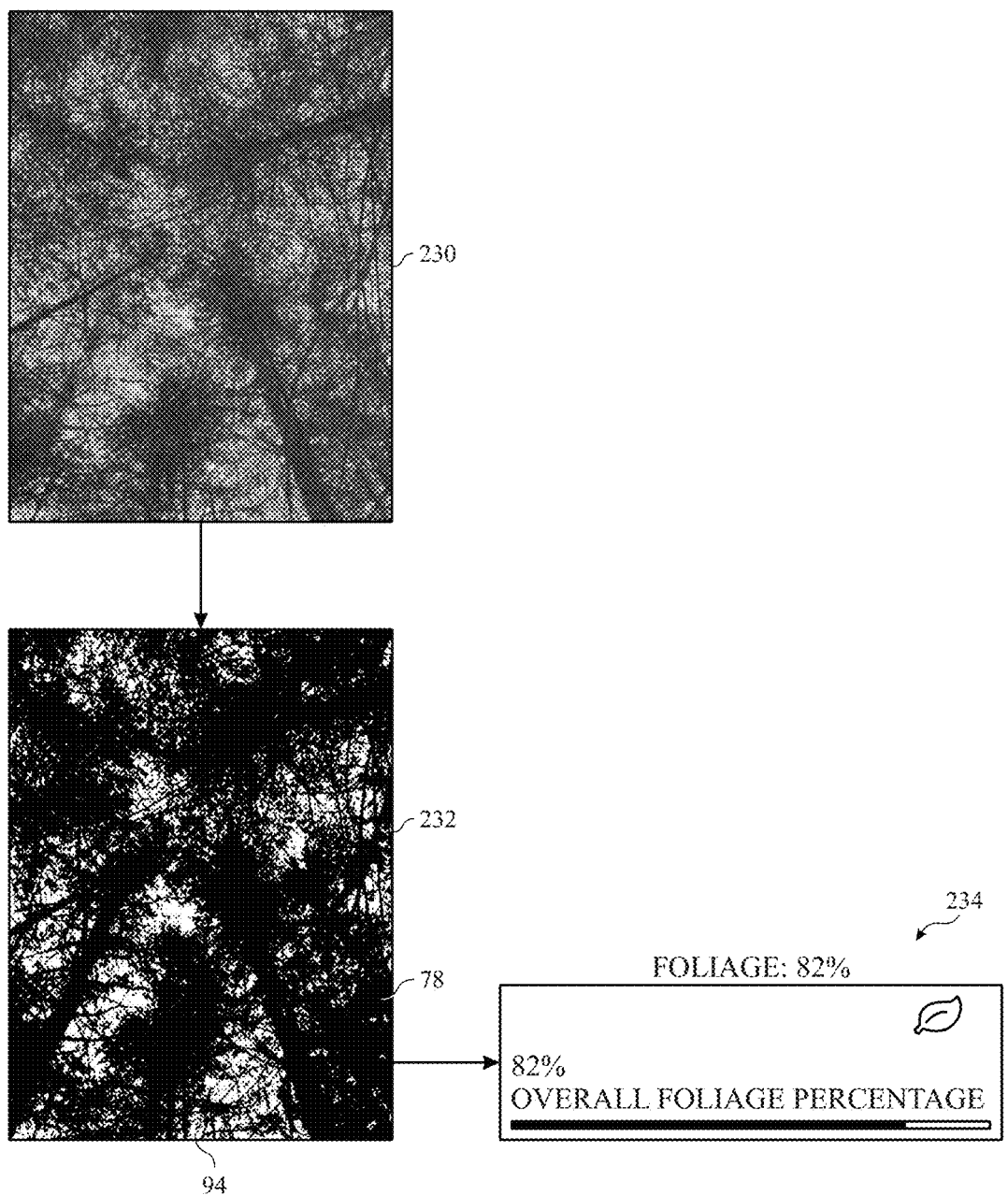
FIG. 17 is an example of a captured image, a processed image, and a foliage determination of heavy foliage, according to embodiments of the present disclosure.

FIG. 17 is another illustrative example of a captured image 230, a processed image 232, and a foliage determination 234 of heavy foliage, according to embodiments of the present disclosure. That is, a camera 56 of the electronic device 10 may capture the image 230, which may correspond to a region 174 of the spherical grid 170 of the upper hemisphere 172 near and/or around the electronic device 10. The image processing logic 194 may process the image 230 to generate the processed image 232, which represents open sky 94 as a 0 value (illustrated as white) and foliage 78 as a 1 value (illustrated as black). The processor 12 then determines, based on the processed image 232, that the region 174 corresponding to the image 230 has 82% foliage (e.g., the foliage determination 234). Based on the example provided above, where heavy foliage refers to when foliage covers between 67% and 100% of the sky as captured in an image, the processor 12 may determine that the image 220 of FIG. 17 indicates heavy foliage.

Figure 18:
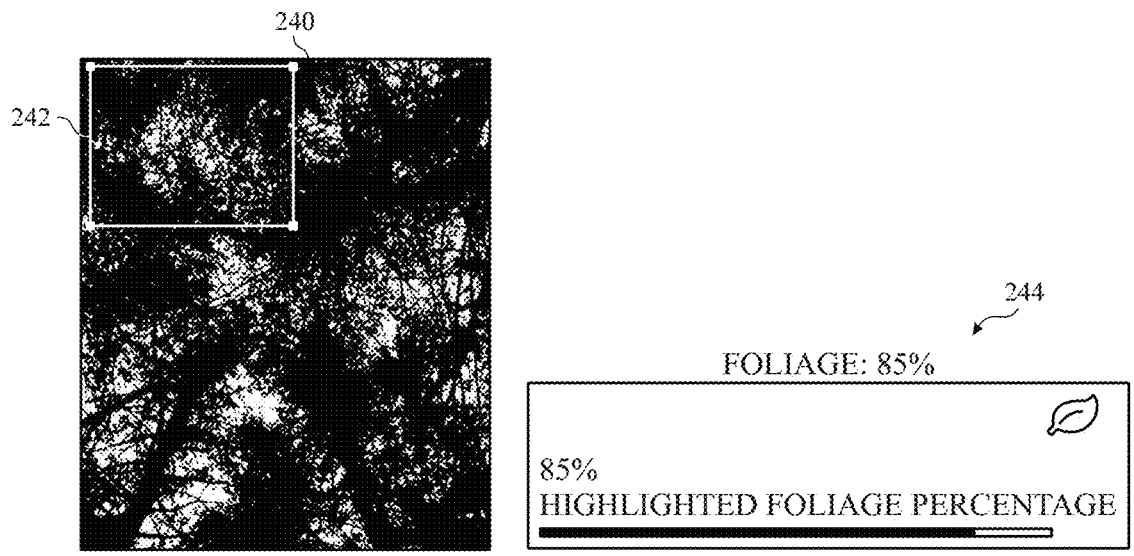
FIG. 18 is an example of a processed image for which a processor of the electronic device of FIG. 1 has selected a subregion and determined a foliage percentage of the selected subregion, according to embodiments of the present disclosure.

In some embodiments, for each region 174 or captured image, the processor 12 may determine foliage for subregions of the region 174 or captured image to provide increased granularity and/or higher accuracy or fidelity. For example, the processor 12 may divide the image 230 of FIG. 17 into any number (e.g., two or more, six or more, eight or more, ten or more, twelve or more, a hundred or more, and so on) of subregions, and determine the foliage for each subregion. In subsequent process block 156 of the method 140 of FIG. 9, the processor 12 may adjust operating characteristics (e.g., communication operating characteristics) for each subregion rather than the entire region 174, resulting in increased granularity and/or higher accuracy or fidelity. FIG. 18 is an illustrative example of a processed image 240 for which the processor 12 has selected a subregion 242 (e.g., along a top-left area of the image 240), and determined a foliage percentage 244 of the selected subregion 242, according to embodiments of the present disclosure. As illustrated, the processor 12 determines the foliage percentage 244 of the selected subregion 242 as 85%.

Figure 19:
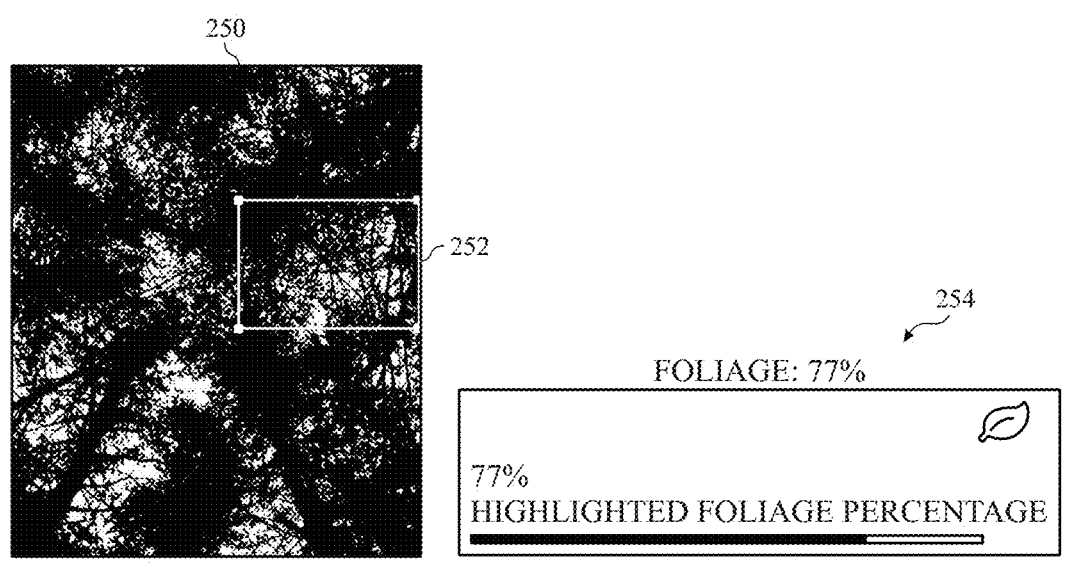
FIG. 19 is another example of the processed image of FIG. 18 for which the processor of the electronic device of FIG. 1 has selected another subregion and determined a foliage percentage of the selected other subregion, according to embodiments of the present disclosure.

FIG. 19 is another illustrative example of a processed image 250 for which the processor 12 has selected another subregion 252 (e.g., along a middle-right area of the image 250), and determined a foliage percentage 254 of the selected other subregion 252, according to embodiments of the present disclosure. As illustrated, the processor 12 determines the foliage percentage 254 of the selected other subregion 252 as 77%. It should be understood that the processor 12 may divide a region 174 or capture image into any suitable number of subregions to determine foliage for each subregion to realize greater accuracy or fidelity. In this manner, the processor 12 may determine the amount of foliage for regions 174 of the grid 170.

Returning to FIG. 9, in process block 154, the processor 12 determines positions of communication hubs 72 corresponding to the regions 174 of the grid 170. In particular, the locations, trajectories, or paths of communication hubs 72 may be known, and the processor 12 may determine the locations or trajectories and/or store the location or trajectories in the memory 14. Moreover, the processor 12 may determine the communication hub 72 that are located in the regions 174 of the grid 170 with respect to the electronic device 10 based on the locations or trajectories. That is, the processor 12 may determine map communication hub positions (e.g., latitude and longitude coordinates and/or azimuth and elevation coordinates of the communication hub positions) to the regions 174 of the spherical grid 170 generated in process block 150, in which the processor has also determined the foliage percentage of each region 174. Turning to FIG. 11, the processor 12 determines positions of communication hubs 72A, 72B, and 72C. In particular, communication hub 72A has an azimuth of 305° and an elevation of 30°, communication hub 72B has an azimuth of 30° and an elevation of 85°, and communication hub 72C has an azimuth of 75° and an elevation of 15°. The processor 12 has also determined that communication hub 72A is accessible (e.g., via a communication link) through region 174A, which the processor 12 has determined has a foliage percentage of 73%. The processor has further determined that communication hub 72B is accessible through region 174B, which the processor 12 has determined has a foliage percentage of 82%. The processor 12 has also determined that communication hub 72C is accessible through region 174C, which the processor 12 has determined has a foliage percentage of 33%.

Returning to FIG. 9, in process block 156, the processor 12 adjusts operating characteristics based on the positions of the available communication hubs 72 and the amount of foliage at corresponding regions 174 of the grid 170. The operating characteristics may include synchronizing with an available communication hub 72 (or other electronic device), performing a handover with the communication hub 72, determining transmission power or an amount to increase transmission power, selecting an antenna 55, determining a beam direction, determining a discontinuous reception (DRX) cycle or a frequency for receiving data, providing an indication (e.g. to a user) to stop or proceed through certain geographical areas (e.g., to take advantage of areas with higher signal quality or avoid areas with lower signal quality), and the like, based on the available communication hubs 72 and the amount of foliage at corresponding regions 174 of the grid 170.

Figures 20, 21:
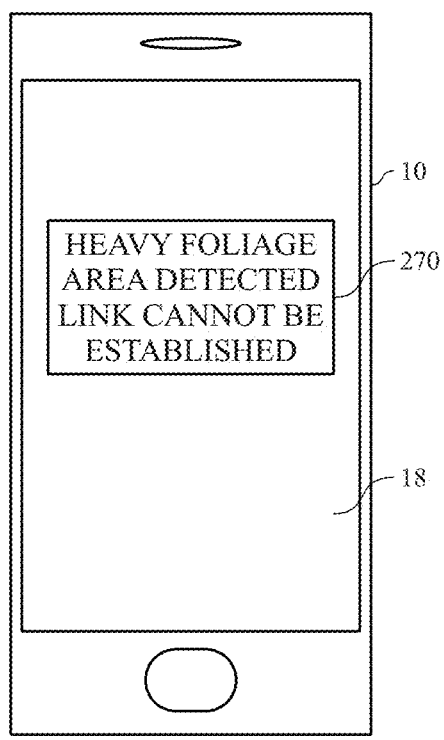
FIG. 20 is a lookup table that assigns a signal impairment value to foliage percentage, according to embodiments of the present disclosure.
FIG. 21 is a perspective diagram of the electronic device of FIG. 1 displaying an indication that the electronic device is located in a heavy foliage area, according to embodiments of the present disclosure.

For example, in the case in which the processor 12 synchronizes (e.g., initially synchronizes) with a communication hub 72 based on the available communication hubs 72 and the amount of foliage at corresponding regions 174 of the grid 170, the processor 12 may create or generate a lookup table in the memory 14 that assigns a radio frequency degradation value (e.g., a power degradation value as shown in FIG. 7 or a signal quality degradation value as shown in FIG. 8) to foliage percentage. FIG. 20 is a lookup table 260 that assigns a signal impairment value 262 to foliage percentage 264, according to embodiments of the present disclosure. In some embodiments, the lookup table 260 may be generated during a manufacturing process of the electronic device 10, though in additional or alternative embodiments, the lookup table 260 may be updated or generated in real-time (e.g., while a consumer or user operates the electronic device 10).

In operation, for each available communication hub 72, the processor 12 may determine a corresponding region 174 of the spherical grid 170 of the upper hemisphere 172 near and/or around the electronic device 10 through which to communicate with a respective communication hub 72, and the amount of foliage (e.g., foliage percentage 264) of the region 174. It should be understood that foliage percentage 264 may also include an amount of foliage, denseness of the foliage, or any other suitable measurement that describes a quantity of foliage or degree of obstruction. Using the lookup table 260, the processor 12 may then determine the amount of signal degradation 262 that would be caused by the foliage percentage 264. For example, referring back to FIG. 11, to communicate with communication hub 72A, the processor 12 may determine that signals may be sent and/or received through region 174A. The processor 12 may further determine that the foliage percentage 264 of the region 174A is 73%. Using the lookup table 260 of FIG. 20, the processor 12 may determine that communicating through the region 174A would result in signal degradation 262 of at least approximately 4 dB.

The processor 12 may apply the signal degradation 262 to a link budget for communicating with the communication hub 72, and determine if a communication link may be established based on, for example, elevation, transmission power, data rate, and so on, of the electronic device 10 and/or the communication hub 72. In some embodiments, if the processor 12 determines that the communication link cannot be established, then the processor 12 will not attempt to establish the communication link. In this manner, the processor 12 may save battery power in the electronic device 10 (as opposed to attempting to establish the communication link when it cannot be established). In some cases, if the communication link is for emergency purposes (e.g., a user indicates that this is an emergency call or communication via an input structure 22 of the electronic device 10), the processor 12 may nevertheless attempt to establish the communication link, even if the processor 12 determines that the communication link cannot be established—due to the severity of the situation. In each of the disclosed embodiments, it should be understood that it is contemplated that any actions performed by the processor 12 (e.g., not attempting to establish a communication link) may be overridden by a user (e.g., via a prompt that enables the user to override an action performed by the processor 12, via a setting configured by the user, and so on).

Moreover, in cases where there are multiple communication hubs 72 to connect to (e.g., as shown in FIG. 11), the processor 12 may select the communication hub 72 with the highest link margin after factoring in signal degradation 262 due to foliage percentage 264. For example, as shown in FIG. 11, if each communication hub 72 has the same link margin before factoring in signal degradation 262 due to foliage percentage 264, then the processor 12 may establish a communication link with communication hub 72C, since it may have the lowest signal degradation 262 (e.g., approximately 0.75 dB) due to foliage percentage 264 (e.g., 33%). However, because each communication hub 72 may have different elevations, transmission powers, data rates, and so on, the respective link margins may differ prior to factoring in signal degradation 262 due to foliage percentage 264. Moreover, the processor 12 may prioritize between multiple communication hubs 72 based on certain preferred operating characteristics (e.g., data rate, transmission power, and so on). That is, if the processor 12 determines that a communication link may be established between two communication hubs (e.g., 72A, 72B), and the first communication hub 72A has a higher link margin than the second communication hub 72B (e.g., in some cases, within a threshold link margin difference), but the second communication hub 72B has a greater data rate than the first communication hub 72A (e.g., in some cases, exceeding a threshold data rate difference), then the processor 12 may establish the communication link with the second communication hub 72B if data rate is prioritized.

Similarly, in the case in which the processor 12 performs a handover (e.g., transfers a communication link) between a first communication hub 72 and a second communication hub 72 (or a first other electronic device and a second other electronic device) based on the available communication hubs 72 and the amount of foliage at corresponding regions 174 of the grid 170, the processor 12 may select the second communication hub 72 based on the highest link margin, which may factor in signal degradation 262 due to foliage percentage 264, as described above with respect to initially synchronizing with a communication hub 72. That is, the processor 12 may determine to handover from the first communication hub 72 to the second communication hub 72 if it determines that the second communication hub 72 has a higher link margin than the first communication hub 72. In the case of selecting from multiple possible communication hubs 72 to which to handover, the processor 12 may determine the link margin for each of the multiple communication hubs 72, and select the communication hub 72 with the highest link margin (or with the best prioritized operating characteristics, such as transmission power, data rate, and so on, as further described above with respect to initially synchronizing with a communication hub 72).

If the processor 12 determines that the communication link cannot be established with the second communication hub 72, the processor 12 may attempt reselection of a communication hub to which to handover. Additionally, the processor 12 may determine future positions of communication hubs 72 based on known trajectories of the communication hubs 72, and, in conjunction with the foliage percentage 264, the processor 12 may determine to wait to perform handover to and/or reselection of a second communication hub 72 until the communication hub 72 becomes available (e.g., moves into range, corresponds to a region 174 with a desired foliage percentage 264 for which to establish a communication link, and so on). That is, the processor 12 may determine that a future availability or position (e.g., azimuth and elevation coordinates) of a communication hub 72 may correspond to a region 174 that exhibits an open sky condition or a light foliage condition, and wait to perform handover to and/or reselection of the communication hub 72 until the communication hub 72 becomes available or reaches the future position. This may realize better communication performance for the electronic device 10.

In the case in which the processor 12 determines transmission power or an amount to increase transmission power (e.g., transmission power step) based on the available communication hubs 72 and the amount of foliage at corresponding regions 174 of the grid 170, such as when the processor 12 attempts to establish a communication channel (e.g., a random access channel (RACH)) with a communication hub 72, the processor 12 may execute a power control algorithm that increases the transmission power or the transmission power step with increasing foliage percentage 264. That is, with increasing amounts of foliage, to establish the communication channel with the communication hub 72, the transmitter 52 of the electronic device 10 may use greater power. As such, the processor 12 may increase the transmission power or the transmission power step (e.g., by 2 dB) when the processor 12 determines there is greater foliage percentage 264 (e.g., medium foliage, heavy foliage, and so on), thus providing a higher likelihood to establish a communication channel with the communication hub 72, and providing better performance. In contrast, with decreasing amounts of foliage (e.g., an open sky, light foliage), the processor 12 may decrease the transmission power or the transmission power step, thus providing power savings. Additionally, these changes to transmission power may be made in real-time, while the electronic device 10 has already established a connection with the communication hub 72. That is, as the electronic device 10 is moved, and the grid 170 changes, such that the regions 174 of the grid 170 also change, and the amounts of foliage are determined, updated, and changed, and positions of the communication hubs 72 change, the processor 12 may increase or decrease transmission power or the transmission power step based on the updated amounts of foliage corresponding to the updated regions 174 of the grid 170 and/or the updated communication hub positions.

In the case in which the processor 12 selects an antenna 55 based on the available communication hubs 72 and the amount of foliage at corresponding regions 174 of the grid 170, the processor 12 may determine the transmission and/or reception antenna(s) 55 that provide radiation patterns (e.g., the best radiation patterns) toward regions 174 with lower foliage percentages 264. That is, due to placement of the antennas 55 in the electronic device, other obstructions to signals sent or received by the antennas 55 (e.g., a user's body), real-world or manufacturing impacts on the antennas 55, orientation of the electronic device 10 as related to placement of the antennas 55, and so on, each antenna 55 may emit a different radiation pattern toward each region 174 of the spherical grid 170 of the upper hemisphere 172 near and/or around the electronic device 10. As such, the processor 12 may determine and select the antenna(s) (e.g., for transmission, for reception, or both) having the radiation pattern toward regions 174 with lower foliage percentages 264 (e.g., an open sky condition, a light foliage condition, and so on). The processor 12 may then send and/or transmit signals using the antenna with the radiation pattern through the corresponding lower foliage region 174.

In the case in which the processor 12 determines a beam direction based on the available communication hubs 72 and the amount of foliage at corresponding regions 174 of the grid 170, the processor 12 may determine or adjust the beam direction emitted by multiple antennas using beamforming techniques to a region 174 with lower foliage percentage 264 (e.g., an open sky condition, a light foliage condition, and so on). This may enable the electronic device 10 to communicate with the communication hub 72 using lower transmission power, as there may be less foliage in the region 174 to attenuate transmission signals. For example, if the link budget between the electronic device 10 and the communication hub 72 is low or marginal (e.g., below a threshold), the processor 12 may determine a beam direction that provides a radiation pattern (e.g., an optimal radiation pattern) that passes through a region 174 with lower foliage. This may enable the electronic device 10 to communicate with the communication hub 72, whereas, without factoring in the foliage percentage 264 of the regions 174, communication may not have been able to be established due to the low link budget.

In some cases, the processor 12 determines a discontinuous reception (DRX) cycle or a frequency for receiving data based on the available communication hubs 72 and the amount of foliage at corresponding regions 174 of the grid 170. In particular, when the processor 12 determines there is an available communication hub 72 where connection may be or is made through a region 174 with a greater foliage percentage 264 (e.g., medium or heavy foliage), then the processor 12 may set a longer DRX cycle (e.g., compared to when there is a lesser foliage percentage 264), such as monitoring a reception channel (e.g., a Physical Downlink Control Channel (PDCCH)) and/or receiving data on the reception channel on the order of every 100 milliseconds (ms). On the other hand, when the processor 12 determines there is an available communication hub 72 where connection may be or is made through a region 174 with a lesser foliage percentage 264 (e.g., open sky or light foliage), the processor 12 may set a shorter DRX cycle, such as monitoring a reception channel and/or receiving data on the reception channel on the order of every 10 ms.

As such, when there is a higher probability of success of the receiver 54 of the electronic device 10 receiving signals from a communication hub 72, the processor 12 may more frequently check and/or receive signals on the reception channel. This provides more efficient power consumption, as it avoids using the battery when there is a lower probability of success of receiving signals from a communication hub 72. Power saving in this manner may be particularly important in, for example, emergency scenarios in remote and/or wooded areas. Accordingly, the processor 12 may rarely check for received signals when there is greater foliage, which may typically decrease signal power and/or quality to the point of blocking signals from getting through, while the processor 12 may check for received signals more frequently when there is lighter foliage, which may typically correspond to a higher likelihood of successfully receiving signals from a communication hub 72.

The processor 12 may additionally or alternatively provide an indication (e.g. to a user) to stop or proceed through certain geographical areas (e.g., to take advantage of areas with higher signal quality or avoid areas with lower signal quality) based on the available communication hubs 72 and the amount of foliage at corresponding regions 174 of the grid 170. For example, if the processor 12 determines that all or most regions 174 of the grid 170 include greater foliage percentage 264 (e.g., medium or heavy foliage) and/or that all or most available communication hubs 72 are only accessible through regions 174 having greater foliage percentage 264, then the processor 12 may provide an indication to proceed. The processor 12 may provide the indication via, for example, the display 18 of the electronic device 10. For example, FIG. 21 is a perspective diagram of the electronic device 10 displaying an indication 270 that the electronic device 10 is located in a heavy foliage area, and that a communication link with a communication hub 72 cannot be established, according to embodiments of the present disclosure. It should be understood that any suitable message that indicates that a communication link cannot be established may be included in the indication 270.

Figure 22:
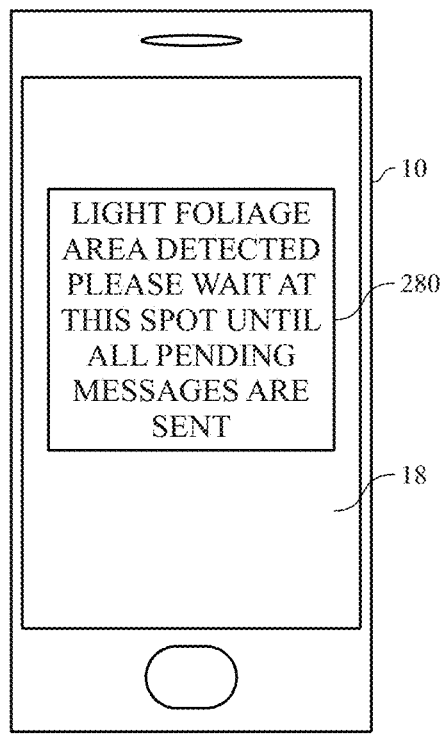
FIG. 22 is a perspective diagram of the electronic device of FIG. 1 displaying an indication that the electronic device is located in a light foliage area, according to embodiments of the present disclosure.

In some embodiments, the transmitter 52 of the electronic device 10 may have attempted to send data (e.g., messages) for a duration of time while, for example, the user hikes through heavy foliage areas. Because the transmitter 52 may not have been able to send the data due to the heavy foliage, the data may have queued up in the memory 14 of the electronic device 10, waiting for a time that a connection may be established with a communication hub 72. As such, when the processor 12 determines that there is at least one region 174 of the grid 170 having lesser foliage percentage 264 (e.g., open sky or light foliage) and/or that an available communication hub 72 is accessible through such a region 174, then the processor 12 may provide an indication to stop while the transmitter 52 sends data (e.g., including any queued data). The processor 12 may provide the indication via, for example, the display 18 of the electronic device 10. For example, FIG. 22 is a perspective diagram of the electronic device 10 displaying an indication 280 that the electronic device 10 is located in a light foliage area, and that the user should wait at this location until all pending messages are sent, according to embodiments of the present disclosure. It should be understood that any suitable message that indicates that a communication link has been established may be included in the indication 270. In some embodiments (e.g., if configured by a user as a setting), the processor 12 may not attempt to send and/or receive data for a threshold foliage (e.g., medium or heavy foliage), and only send and/or receive data if the determined foliage is less than the threshold foliage (e.g., open sky or light foliage).

Figure 23:
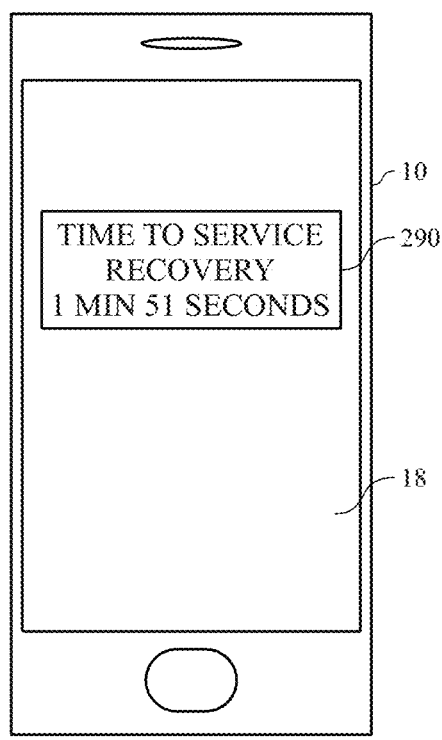
FIG. 23 is a perspective diagram of the electronic device of FIG. 1 displaying an indication that a communication link may be established with a communication hub at a future time, according to embodiments of the present disclosure.

Moreover, in cases in which a communication link cannot be established or that the processor 12 determines that a communication link cannot be established with a communication hub 72, the processor 12 may determine that a future position (e.g., azimuth and elevation coordinates) of a communication hub 72 may correspond to a region 174 that exhibits an open sky condition or a light foliage condition. Accordingly, the processor 12 may provide an indication to wait and/or a duration of time to wait until the communication hub 72 becomes accessible via the region 174. For example, FIG. 23 is a perspective diagram of the electronic device 10 displaying an indication 290 that a communication link may be established with a communication hub 72 at a future time, according to embodiments of the present disclosure. In particular, the indication 290 provides that communication may be established with the communication hub 72 in 1 minute and 51 seconds. It should be understood that any suitable message that indicates that a communication link may be established and/or that a communication hub 72 may be accessible in the future may be included in the indication 290.

In some embodiments, the processor 12 may provide indications of directions to move to reach a region 174 of lesser foliage percentage or tilt the electronic device 10 to align one or more antennas 55 with the region 174. For example, the processor 12 may store multiple spherical grids 170 of upper hemispheres 172 near and/or around the electronic device 10 in the memory 14 or the storage 16, and may provide indications (e.g., via the display 18) of directions to move to return to locations with regions 174 of the grids 170 have lower foliage percentage 264. As another example, the orientation of the electronic device 10 as detected by the motion sensor 58, the locations of the antennas 55, and the locations of the regions 174 (or subregions as shown in FIG. 17) of the grid 170 having lower foliage percentage 264, the processor 12 may determine orientations of the electronic device 10 that increase or maximize signal quality and/or power (e.g., that cause one or more antennas 55 to direct their radiation power to the regions 174 or subregions of the grid 170 having lower foliage percentage 264), and provide indications (e.g., via the display 18) to position the electronic device in those orientations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method performed by a mobile communication device, comprising;
    capturing images using a camera of the mobile communication device;
    generating, via processing circuitry of the mobile communication device, a spherical upper hemisphere grid based on the images;
    determining, via the processing circuitry, a degree of obstruction for one or more regions of the spherical upper hemisphere grid; and
    adjusting, via the processing circuitry, one or more operating characteristics for communicating with one or more communication hubs based on a position of the one or more communication hubs corresponding to the one or more of the regions and the degree of obstruction at the one or more of the regions, wherein the one or more operating characteristics comprises a transmission power or an amount to increase transmission power of a transceiver.

2. The method of claim 1, comprising determining, via the processing circuitry, that a receive operating characteristic is less than a threshold value, wherein capturing the images using the camera of the mobile communication device occurs in response to determining that the receive operating characteristic is less than the threshold value.

3. The method of claim 2, wherein the receive operating characteristic comprises a power level of a received signal, a signal quality of the received signal, or both.

4. The method of claim 1, comprising determining, via the processing circuitry, an amount of ambient light in the images, wherein determining, via the processing circuitry, the degree of obstruction for the regions of the spherical upper hemisphere grid is based on the amount of ambient light.

5. The method of claim 1, wherein adjusting, via the processing circuitry, the one or more operating characteristics comprises adjusting, via the processing circuitry, synchronization with the one or more communication hubs.

6. The method of claim 1, wherein adjusting, via the processing circuitry, the one or more operating characteristics comprises adjusting, via the processing circuitry, a handover procedure with the one or more communication hubs.

7. The method of claim 1, wherein the one or more operating characteristics comprises a frequency for receiving data.

8. The method of claim 1, comprising determining, via the processing circuitry, a discontinuous reception cycle or a frequency for receiving data, wherein adjusting, via the processing circuitry, the one or more operating characteristics is based on the discontinuous reception cycle or the frequency for receiving data.

9. The method of claim 1, comprising generating, via the processing circuitry a lookup table that assigns a radio frequency degradation value or a signal quality degradation value to the degree of obstruction.

10. One or more tangible, non-transitory, computer-readable media, comprising instructions that cause one or more processors to:
receive a plurality of images;
generate a portion of a spherical grid based on the plurality of images;
determine a plurality of foliage quantities for a plurality of regions of the portion of the spherical grid;
determine one or more communication node positions corresponding to the plurality of regions; and
adjust one or more operating characteristics based on the one or more communication node positions and the plurality of foliage quantities for the plurality of regions, wherein the one or more operating characteristics comprises selection of an antenna to send or receive signals via a transceiver.

11. The one or more tangible, non-transitory, computer-readable media of claim 10, wherein the instructions cause the one or more processors to determine that the plurality of foliage quantities for a geographical area is greater than a threshold level, and provide an indication to proceed through the geographical area.

12. The one or more tangible, non-transitory, computer-readable media of claim 10, wherein the instructions cause the one or more processors to determine that the plurality of foliage quantities for a geographical area is less than a threshold level, and provide an indication to stop in the geographical area.

13. The one or more tangible, non-transitory, computer-readable media of claim 10, wherein the instructions cause the one or more processors to determine that a foliage quantity of the plurality of foliage quantities corresponding to a region of the plurality of regions for a geographical area is less than a threshold level, determine that a communication node position will correspond to the region at a future time, and provide an indication to stop in the geographical area until the future time.

14. The one or more tangible, non-transitory, computer-readable media of claim 10, wherein the instructions cause the one or more processors to determine the plurality of foliage quantities for the plurality of regions of the portion of the spherical grid by performing image processing to determine open sky portions and foliage portions of each region of the plurality of regions.

15. The one or more tangible, non-transitory, computer-readable media of claim 10, wherein the instructions cause the one or more processors to determine a plurality of signal impairment values caused by the plurality of foliage quantities.

16. An electronic device, comprising:
a camera;
one or more antennas;
a transceiver configured to send and receive signals via the one or more antennas; and
processing circuitry communicatively coupled to the transceiver and configured to
cause the camera to capture images;
generate a spherical upper hemisphere grid based on the images;
determine an amount of foliage for regions of the spherical upper hemisphere grid;
determine one or more positions of one or more additional electronic devices corresponding to one or more regions; and
adjust one or more operating characteristics of the transceiver based on the one or more positions of the one or more additional electronic devices and the amount of foliage at the one or more regions, wherein the one or more operating characteristics comprises selection of a beam direction of a beam formed by the one or more antennas to send or receive signals via the transceiver.

17. The electronic device of claim 16, comprising one or more motion sensors, wherein the processing circuitry is configured to determine an orientation of the electronic device based on receiving sensor information from the one or more motion sensors.

18. The electronic device of claim 17, wherein the processing circuitry is configured to cause the camera to capture the images based on the orientation of the electronic device.

19. The electronic device of claim 17, wherein the processing circuitry is configured to provide an indication to move the electronic device based on the orientation of the electronic device, and cause the camera to capture the images based on the electronic device being moved.

20. The electronic device of claim 16, wherein the processing circuitry is configured to:
determine one or more radiation patterns of the one or more antennas; and adjust the one or more operating characteristics of the transceiver by selecting an antenna of the one or more antennas to send or receive signals based on the one or more radiation patterns.

* * * * *